United States Patent [19]

Stivers

[11] Patent Number: 5,464,530
[45] Date of Patent: Nov. 7, 1995

[54] ION EXCHANGE METHODS AND SYSTEMS INCORPORATING REGENERANT RECYCLING

[76] Inventor: Lewis E. Stivers, 920 Westbrook Dr., Plano, Tex. 75075

[21] Appl. No.: 163,649

[22] Filed: Dec. 8, 1993

[51] Int. Cl.$^6$ .................................................. C02F 1/42
[52] U.S. Cl. .......................... 210/141; 210/142; 210/269; 210/279; 210/677; 210/678
[58] Field of Search .................................. 210/677, 678, 210/269, 279, 793, 141, 142

[56] References Cited

U.S. PATENT DOCUMENTS

| | | | |
|---|---|---|---|
| 2,692,244 | 10/1954 | Kunin et al. | 210/678 |
| 2,773,829 | 12/1956 | Hunting | 210/678 |
| 2,773,830 | 12/1956 | Farmer et al. | 210/678 |
| 2,855,364 | 10/1958 | Roberts | 210/678 |
| 3,143,500 | 8/1964 | Damgaard | 210/678 |
| 3,240,699 | 3/1966 | Duff et al. | 210/678 |
| 3,276,585 | 10/1966 | Kalinske | 210/807 |
| 3,335,868 | 8/1967 | Schiffers | 210/279 |
| 3,351,550 | 11/1967 | Kraiker, Jr. | 210/677 |
| 3,402,126 | 9/1968 | Cioffi | 210/678 |
| 3,517,817 | 6/1970 | Hitzel | 210/279 |
| 3,527,718 | 9/1970 | Coburn | 210/678 |
| 3,531,401 | 9/1970 | Crits | 210/677 |
| 3,617,558 | 11/1971 | Jones | 210/677 |
| 3,655,587 | 4/1972 | Bouchard et al. | 210/678 |
| 3,687,843 | 8/1972 | Emmett | 210/678 |
| 3,711,401 | 1/1973 | Hamilton et al. | 210/677 |
| 4,039,443 | 8/1977 | Tahara et al. | 210/677 |
| 4,163,717 | 8/1979 | Blind et al. | 210/677 |
| 4,321,145 | 3/1982 | Carlson | 210/678 |
| 4,379,855 | 4/1983 | Down et al. | 210/677 |
| 4,528,101 | 7/1985 | Burke et al. | 210/677 |
| 4,648,976 | 3/1987 | Chen | 210/678 |
| 5,108,616 | 4/1992 | Kunz | 210/678 |
| 5,145,765 | 5/1995 | Banham et al. | 210/142 |
| 5,212,205 | 5/1993 | O'Brien | 210/678 |
| 5,346,623 | 9/1994 | Kunz et al. | 210/678 |
| 5,348,659 | 9/1994 | Kunz et al. | 210/678 |

OTHER PUBLICATIONS

Dow Chemical Brochure, "Dow Chemical Europe—Introducing the UP.CO.RE System", pp. 1–21, Jul., 1984.
Rohm & Haas Brochure, "AMBERPACK™ Reverse–Flow Packed–Bed Ion Exchange System," pp. 1–8, Sep., 1993.
Sybron Chemicals Inc. Brochure, "General Ion Exchange Bulletin: IONAC® Ion Exchange Resins for Softening, Deionization and Process Application", 7 p., Apr. 1988.
McGarvey, "Introduction to Industrial Ion Exchange", Sybron Chemicals Inc. Brochure, pp. 1–11, May 1988.
Sybron Chemicals Inc. Brochures–Cation Exchange Resins: C–249 (6 p. Jun. 1986 & Dec. 1989);
Sybron Chemicals Inc. Brochures: ASB–1P, ASB–2, A–641, A–651 and AFP–329 (62 p. Dec. 1989; A–554 (4 p. Nov. 1989).
McGarvey, et al: "Dealkalization of Water Supplies", 19th Annual Liberty Bell Corrosion Course (Sep. 1981), Sybron Chemicals Inc. Brochure, 17 p., Rev. Oct. 1987.

Primary Examiner—Cynthia L. Nessler
Attorney, Agent, or Firm—David H. Judson

[57] ABSTRACT

An ion exchanger of the countercurrent type includes a pressure vessel for supporting a resin bed. The vessel includes a first port through which water to be treated is supplied to the vessel during a production cycle, a second port through which regenerant is supplied to the vessel during a regenerant cycle, and a third port located intermediate of the first and second ports and connected to a lower in-bed distributor located within the vessel. A recycling loop is provided between the third port and the first port for recycling regenerant during at least a portion of the regeneration cycle. An upper in-bed distributor is located within the vessel slightly above the lower in-bed distributor and has an associated fourth port through which waste regenerant is removed from the vessel during the regeneration cycle. Due to the recycling loop, the portion of the bed located between the top of the vessel and the upper in-bed distributor operates in a cocurrent mode while the portion of the bed located between the lower in-bed distributor and the bottom of the vessel operates in a countercurrent mode. Thus during a normal regeneration cycle the vessel exhibits both cocurrent and countercurrent operation.

6 Claims, 1 Drawing Sheet

ION EXCHANGE METHODS AND SYSTEMS INCORPORATING REGENERANT RECYCLING

TECHNICAL FIELD

The present invention relates generally to water treatment and more particularly to industrial ion exchange methods and systems.

BACKGROUND OF THE INVENTION

Ion exchange systems are well-known in the prior art. Such systems typically include a pressure vessel in which a bed of resin is supported. The resin material facilitates the ion exchange process and must be periodically replenished or "regenerated". Thus in operation the systems have two major cycles of operation, a production cycle in which the raw water or other feed is treated and then exhausted from the vessel, and a regeneration cycle, during which a regenerant is provided to the vessel to replenish the resin. Such operational modes are further characterized in the art as either cocurrent or countercurrent. In a cocurrent mode, downflow is employed for both the production and the regeneration cycles. In the countercurrent mode, the regenerant is applied in a flow opposite from the production cycle feed flow. Prior art countercurrent systems have been built with the regenerant applied upflow or downflow.

The prior art ion exchange systems have many shortcomings. Cocurrent operation leaves a residue of ions from the previous regeneration. Thus, following regeneration, the lowest quality resin is at the bottom of the vessel adjacent the exhaust, precisely where the best quality resin is needed most for the next production cycle. Countercurrent operation solves this problem to enable the best quality resin (following regeneration) to be adjacent the exhaust. On the other hand, by its very nature countercurrent operation creates a fluidized bed during the regeneration cycle. Thus the prior art has developed several somewhat costly and complicated techniques to hold the resin bed in place during regeneration. Typically this has been accomplished through use of a counterflow of water or gas above the bed, or through use of inert fillers above the bed. While systems employing countercurrent operation have better production efficiency and higher product quality than cocurrent systems, there still remains a long-felt need in the ion exchange art to enhance the performance of such prior art systems.

BRIEF SUMMARY OF THE INVENTION

It is thus a principal object of the present invention to provide industrial ion exchange systems and methods which overcome the problems of the prior art to provide higher product quality at efficient production rates.

It is a more detailed object of the invention to provide an ion exchanger that advantageously recycles regenerant during regeneration.

It is a particular object of the invention to provide an ion exchanger that simultaneously exhibits substantially countercurrent operation in a first portion thereof and substantially cocurrent operation in a second portion thereof.

It is a further object of the invention to provide regenerant recycling in a standard bed ion exchanger to obviate water, gas or other filler block techniques otherwise necessary to prevent the bed from moving during regeneration.

It is another object to provide such recycle regeneration ion exchange methods in packed-bed or standard bed pressure vessels.

It is still another object to use the inventive regenerant recycle regeneration ion exchanger for softening, cation exchange and anion exchange applications.

These and other objects of the invention are provided in an ion exchanger that includes a pressure vessel for supporting a resin bed. The vessel has a first port through which water to be treated is supplied to the vessel during a production cycle, a second port through which treated water is removed during the production cycle and through which regenerant is supplied to the vessel during a regenerant cycle, and a third port located intermediate of the first and second ports and connected to a lower in-bed distributor located within the vessel. According to the invention, a recycling loop is provided between the third port and the first port for recycling regenerant during at least a portion of the regeneration cycle. An upper in-bed distributor is located within the vessel slightly above the lower in-bed distributor and has an associated fourth port through which waste regenerant is removed from the vessel during the regeneration cycle. Due to the recycling loop, the portion of the bed located between the first port and the upper in-bed distributor operates in a substantially cocurrent mode while the portion of the bed located between the lower in-bed distributor and the second port operates in a substantially countercurrent mode. Thus during the same regeneration cycle the vessel exhibits both cocurrent and countercurrent operation.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
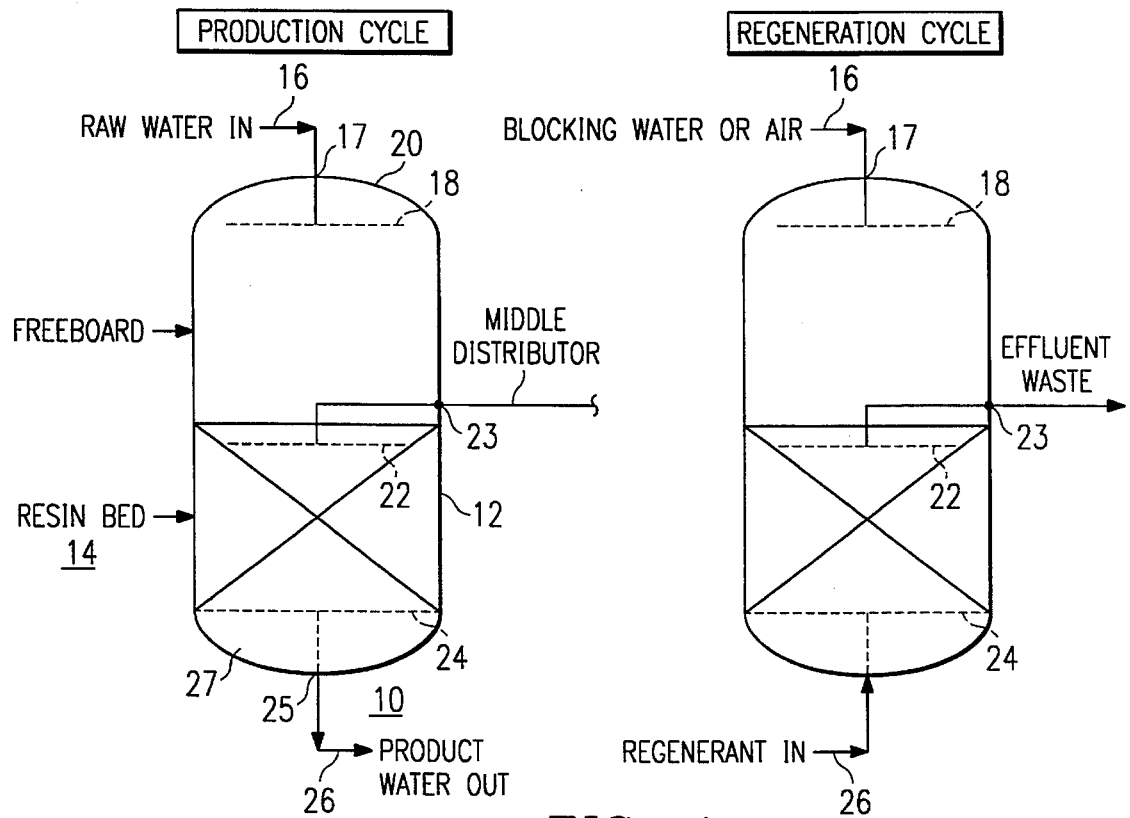
FIG. 1 is a schematic diagram of a conventional countercurrent ion exchanger of the prior art illustrating the production and regeneration cycles of operation.

With reference to FIG. 1, a conventional countercurrent ion exchanger 10 is illustrated schematically to show the well-known production and regeneration cycles of operation. Ion exchanger 10 comprises a pressurized vessel 12 in which a resin bed 14 is supported. This particular example is a so-called "standard" bed; it is also known in the art to completely fill the vessel to create a so-called "packed" bed exchange vessel. The exchanger includes a conduit 16 for supplying fluids to an upper or "first" port 17 and then to a first distributor 18 located adjacent the top 20 of the vessel 12. A second distributor 22 is centrally-located in the vessel 12 and has an associated port 23. A third distributor 24 is located adjacent the bottom 27 of the vessel 12. A bottom or "second" port 25 of the vessel 12 is connected between the third distributor 24 and a lower supply conduit 26. As is well-known, a distributor generally comprises a piece of piping having holes therein for enabling fluids to flow in and out of the piping. A wire screen typically surrounds the piping to prevent resin beads from entering the piping. Suitable structural braces or the like are used to support the distributors in the vessel, as is well-known.

The left-side of the figure illustrates the production cycle, and the right-side illustrates the regeneration cycle. During production, raw water or other feed to be treated is supplied via conduit 16, into upper port 17 and into the first distributor. The feed flows out of the distributor downward into and through the resin bed 14 to effect ion exchange. The treated feed is collected by the third distributor 24 and drained via bottom port 25 and conduit 26. During the regeneration cycle, regenerant is supplied via conduit 26 and into the bottom port 25 for upflow via the third distributor 24. At the same time, blocking water or air is supplied via the conduit 16, upper port 16 and first distributor 18 to retain in place the bed, which would otherwise rise due to fluidization. The regenerant and effluent waste are removed via the second distributor 22 via port 23.

The conventional countercurrent ion exchanger 10 also includes a regenerant source and appropriate valving (not shown) to control operation of the apparatus. Such components are well-known.

Figure 2:
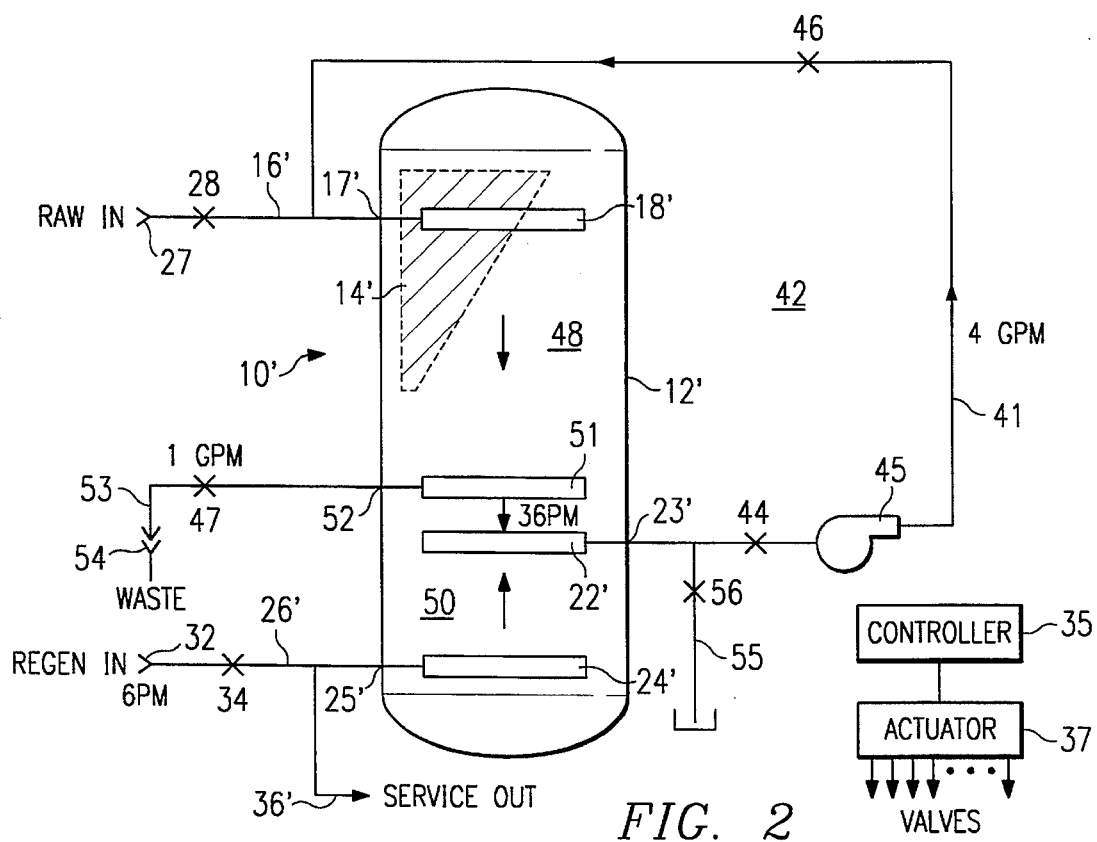
FIG. 2 is a schematic diagram of the recycle regeneration ion exchanger of the present invention.

The inventive ion exchange system is shown in FIG. 2. As will be seen, the system advantageously "recycles" the regenerant during regeneration to provide better product quality at more efficient production rates as compared to the prior art system such as shown in FIG. 1. Moreover, due to this recycling, it will be seen that an upper portion of the vessel operates in a substantially cocurrent mode of operation while the lower portion of the vessel operates in a substantially countercurrent mode of operation during the same regeneration cycle. This operation provides significant advantages over the prior art.

The inventive exchanger 10' includes the pressure vessel 12' supporting the resin bed 14'. Although the invention is illustrated for use with a packed resin-bed, it is equally applicable in standard bed vessels (such as shown in FIG. 1) where the resin does not fill the entire vessel. Exchanger 10' includes the upper and lower supply conduits 16' and 26', the ports 17', 23' and 25', and the first, second and third distributors 18', 22' and 24' as previously described, although both the function and location of the distributor 22' have been altered for reasons to be seen. A source 27 of inlet water to be treated is provided to conduit 16 (and thus to the port 17') by actuation of the valve 28. A source 32 of acid, caustic or brine regenerant (depending on the particular exchange application) is provided and is delivered to conduit 26' under the control of valve 34. Valves 28 and 34 are preferably automatic and are controlled by a controller 35 and actuating means 37 as is conventional in the art. Conduit 26' connects to a service conduit 36, which delivers the treated water (provided via port 25') through appropriate valving (not shown).

According to one important feature of the invention, a regenerant recycle loop 42 is connected between the port 23' and the conduit 16'. The recycle loop 42 preferably comprises a fluid conduit 41 in which are supported a first valve 44, a regenerant pump 45 and a second valve 46. First valve 44 is connected between the port 23' and the pump 45 and second valve 46 is connected between the pump and the port 17'. Second valve 46 may be omitted.

As represented in FIG. 2, rather than being centrally-located, the distributor 22' is preferably located about one-fourth (¼th) of the way up the vessel's length. It is designated a "lower" in-bed distributor as the vessel also includes another distributor 51 located just above the lower in-bed distributor 22'. In particular, distributor 51 is an "upper" in-bed distributor supported about 6" above the distributor 22'. The upper distributor 51 is connected to a fourth port 52. Port 52 connects to a fluid conduit 53 connected to a drain 54. A valve 47 is supported in the fluid conduit 53. The exchanger also includes a rinse conduit 55 connected to the fluid conduit 41. A valve 56 is supported in the rinse conduit.

The portion 48 of the bed above the distributor 51 (i.e., the portion substantially between the distributor 51 and the top of the vessel) holds approximately three (3) times the amount of resin as does the portion 50 of the bed below the distributor 22' (i.e., the portion substantially between the distributor 22' and the bottom of the vessel). Portion 48 corresponds to a first portion of the vessel and portion 50 corresponds to a second portion. This positioning of the in-bed distributors is preferred although not required for proper operation of the loop 42. As will be seen, the first portion of the vessel operates in a cocurrent mode while the second portion operates in a countercurrent mode.

In particular, during the production cycle, valves 34, 44, 46, 47 and 56 are closed, and valve 28 is open to enable the feed from 26 to flow downward through the vessel 12' and out the service conduit 36. During the regeneration cycle, valve 28 is closed to terminate the water flow. At the beginning of the regeneration cycle, valve 34 is opened to begin the regenerant flow. At about the same time, valves 44, 46 and 47 are opened and pump 45 is turned on. Once activated, the pump 45 provides regenerant recycling through the loop 42. As the recycled regenerant re-enters the vessel through port 17', it is flowed out of the distributor 18', through the upper portion of the resin bed and then partially collected by the upper in-bed distributor 51. Some of the collected regenerant is then output via the fourth port to the drain. This downflow corresponds to the downflow of the water during the production cycle and thus such operation of the vessel in portion 48 is substantially "cocurrent."

At the same time, however, the pure regenerant is introduced via port 25' and flows upwards through the second portion 50 of the vessel by an externally applied source of pressure, which also forces water and regenerant out the fourth port 52 to drain. Such upflow is opposite the downflow of the water during the production cycle, thus the lower portion of the vessel operates in the countercurrent mode. Regenerant collected in the lower in-bed distributor 22' is fed to pump 45 for the recycle loop.

At the end of the regeneration cycle, valves 34, 44, 46 and 47 are closed and valve 56 is opened to facilitate displacement rinse down, typically with water supplied via conduit 16'.

Although not meant to be limiting, preferably the placement of the distributors 22' and 51 in the lower quarter of the vessel facilitate flow rates in the loop of approximately 4:1 as compared to the flow rate in the supply conduit 26' and the waste conduit 53.

The regenerant recycle loop provides significant advantages. Most importantly, it insures that the highest quality regenerant is located in the bottom portion 50 of the vessel adjacent the service port so that during the next production cycle optimum ion exchange performance is obtained. It removes the least pure regenerant via the upper in-bed distributor. As a result, the overall quality of the resin in the bed is substantially more uniform over its entire depth as compared to the prior art. The use of the recycle loop further obviates use of a separate water or gas blocking flow to maintain the bed during the regeneration cycle. Recycling reduces the consumption of regenerant and of the water or gas that would otherwise be necessary as a blocking flow. The regeneration cycle itself is shorter because the regenerant is more efficiently utilized. Further, a more efficient exchange of ions occurs since there is intimate contact of the resin to a higher volume of regenerant due to the recycling.

While the present invention is illustrated in connection with cation or anion exchange applications, it should be appreciated that the techniques may also be implemented in water softening applications as well. Also, the inventive process is not limited to ion exchangers for water treatment. Commercial installations include ion exchangers for such processes as purification of sugar solutions, separation and purification of drugs and fine chemicals, purification of waste effluents and the recovery of valuable wastes. The inventive ion exchanger is useful is any such application.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. An ion exchanger, comprising:

a pressure vessel containing a resin bed, the vessel including a first port defining means for supplying water to be treated to the vessel during a production cycle and for supplying recycled regenerant to the vessel during a regenerant cycle, a second port defining means for removing treated water from the vessel during the production cycle and for supplying regenerant to the vessel during a regenerant cycle, a third port located intermediate of the first and second ports, said third port defining means for supplying recycled regenerant, and a fourth port located intermediate of the first and third ports, said fourth port defining means for draining collected regenerant;

an upper in-bed distributor located in the vessel and connected to the fourth port and defining means for collecting regenerant to be drained from the vessel;

a lower in-bed distributor located below the upper in-bed distributor and connected to the third port and defining means for collecting regenerant to be recycled to the first port;

a first fluid conduit connecting the third port and the first port;

a second fluid conduit connecting the fourth port to a drain; and pump means supported in the first fluid conduit for pumping collected regenerant from the third port to the first port and for performing, during the regenerant cycle, substantially cocurrent operation relative to the production cycle feed flow in the portion of the vessel located between the first port and the upper in-bed distributor and in the portion of the vessel located between the upper in-bed distributor and the lower in-bed distributor, and including means for performing substantially countercurrent operation relative to the production cycle feed flow in the portion of the vessel located between the lower in-bed distributor and the second port.

2. An ion exchanger, comprising:

a pressure vessel containing a resin bed, the vessel including a first port defining means for supplying water to be treated to the vessel during a production cycle and for supplying recycled regenerant during a regenerant cycle, a second port defining means for removing treated water during the production cycle and for supplying regenerant to the vessel during the regenerant cycle, and third and fourth ports located intermediate of the first and second ports;

an upper in-bed distributor connected to the fourth port and defining means for collecting regenerant to be drained from the pressure vessel;

a lower in-bed distributor connected to the third port and located below the upper in-bed distributor and defining means for collecting regenerant to be recycled to the first port; and means for recycling regenerant between the third port and the first port and for performing, during the regenerant cycle, substantially cocurrent operation relative to the production cycle feed flow in a first portion of the pressure vessel above the upper in-bed distributor and in a second portion of the pressure vessel between the upper in-bed distributor and the lower in-bed distributor and for performing substantially countercurrent operation relative to the production cycle feed flow in a third portion of the pressure vessel below the lower in-bed distributor.

3. The ion exchanger as described in claim 2 wherein the lower in-bed distributor is located approximately one-fourth (¼th) of a distance between the first and second ports.

4. The ion exchanger as described in claim 8 wherein the recycling means comprises:

a fluid conduit connecting the third port and the first port;

a pump connected to the fluid conduit;

a first valve supported in the fluid conduit between the third port and the pump; and a second valve supported in the fluid conduit between the pump and the first port.

5. The ion exchanger as described in claim 4 wherein the recycling means further comprises:

a fluid conduit connecting the fourth port to a drain; and a third valve supported in the fluid conduit connecting the fourth port and the drain.

6. The ion exchanger as described in claim 5 further including control means for actuating the first, second and third valves and the pump to begin the regeneration cycle.

* * * * *